Jan. 9, 1951   H. L. KRAEFT   2,537,679
FRONT WHEEL SUSPENSION FOR BICYCLES
Filed July 26, 1947   3 Sheets-Sheet 1

INVENTOR.
HERMAN L. KRAEFT
BY Fay, Golrick & Fay
ATTORNEYS

Jan. 9, 1951             H. L. KRAEFT             2,537,679
FRONT WHEEL SUSPENSION FOR BICYCLES
Filed July 26, 1947                                        3 Sheets-Sheet 2
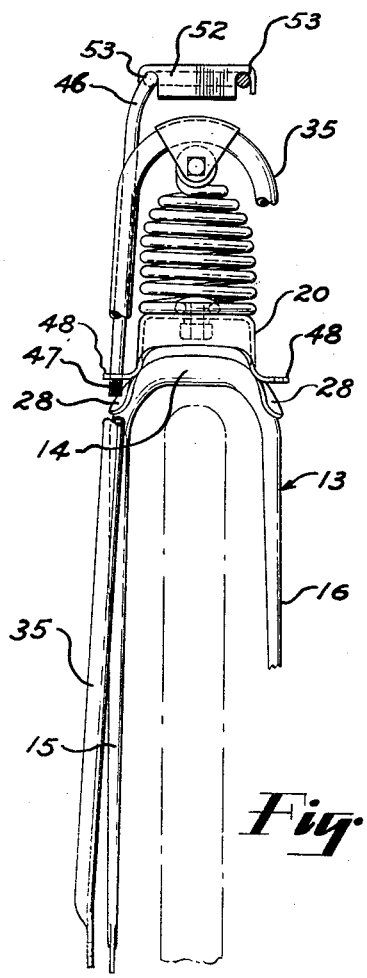
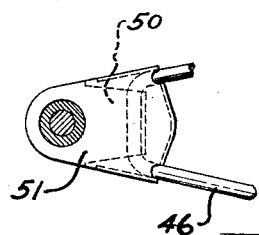
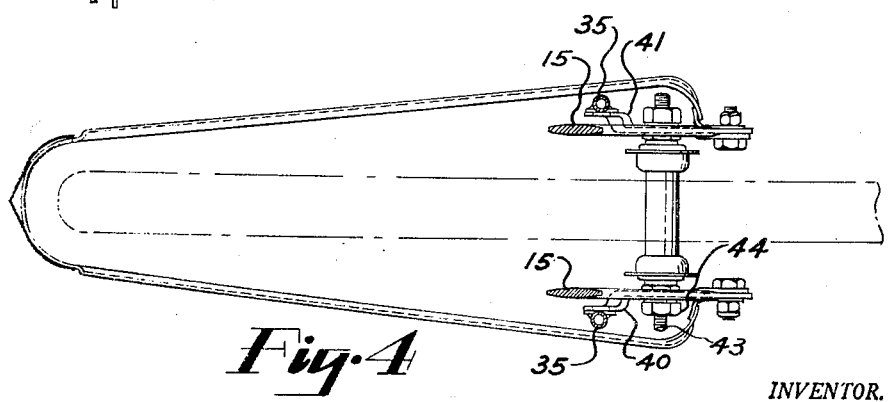
INVENTOR.
HERMAN L. KRAEFT
BY *Fay, Golrick & Fay*
ATTORNEYS

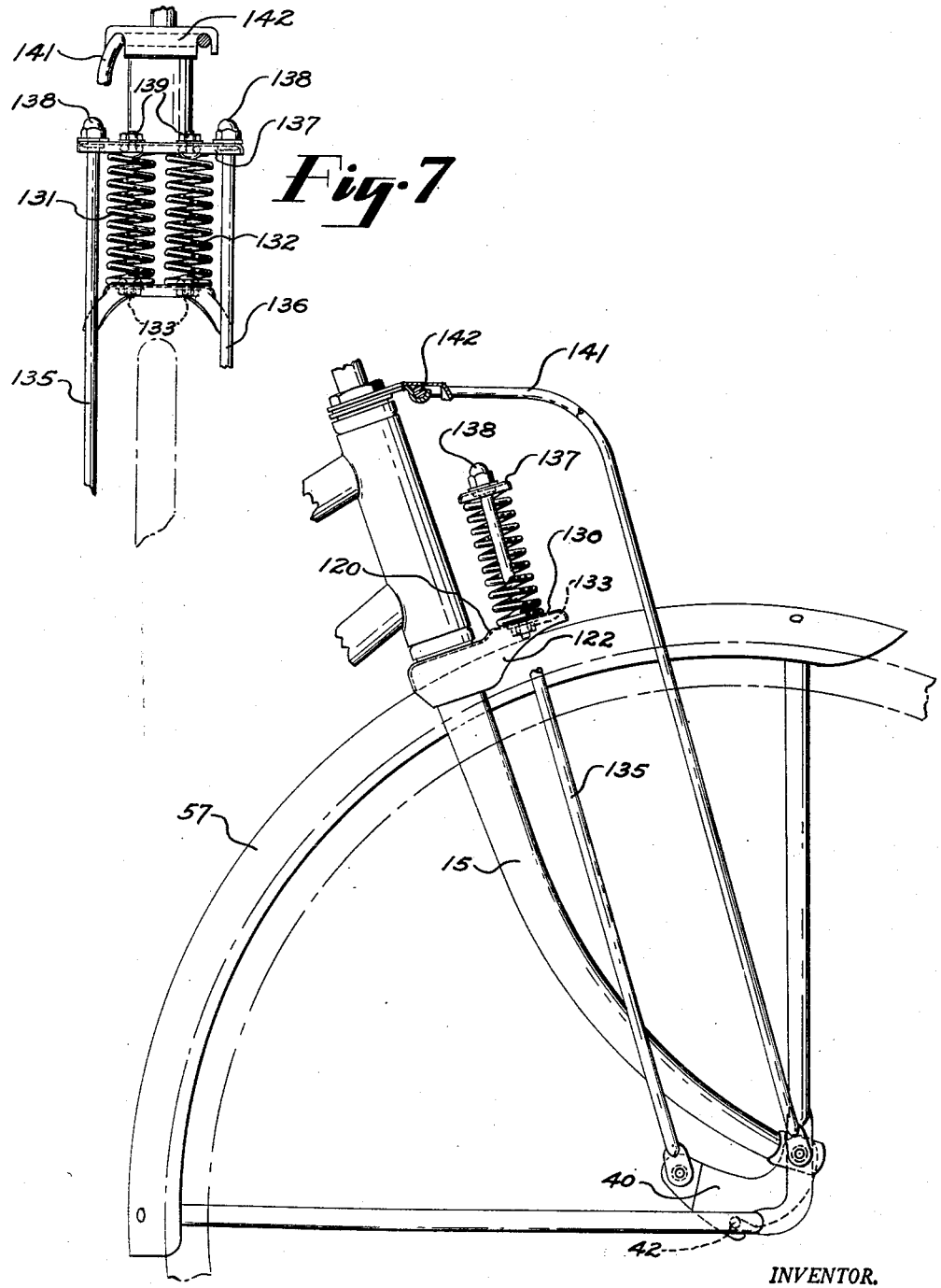

Patented Jan. 9, 1951

2,537,679

UNITED STATES PATENT OFFICE 2,537,679

FRONT WHEEL SUSPENSION FOR BICYCLES

Herman L. Kraeft, Cleveland Heights, Ohio, assignor to The Murray-Ohio Manufacturing Company, Cleveland, Ohio, a corporation of Ohio Application July 26, 1947, Serial No. 763,929

1 Claim. (Cl. 280—277)

The present invention relates to an improved spring suspension structure for the front wheel of a bicycle or the like.

An object of the invention is to provide a spring suspension structure for the front wheel of a bicycle or the like which may be inexpensively manufactured and which will afford a neat appearance in keeping with the front wheel assembly of the bicycle.

Other objects and advantages of the invention will be apparent from the following description of a preferred form of the invention, reference being made to the accompanying drawings wherein:

Fig. 3 is a front view in elevation of the front wheel structure, certain parts being broken away and certain other parts being omitted;

Fig. 4 is a view in section taken substantially along line 4—4 of Fig. 1;

Fig. 5 is a view taken on line 5—5 of Fig. 1;

Fig. 6 is a fragmentary side view of a bicycle front wheel assembly embodying another form of the invention; and Fig. 7 is a fragmentary front view of the assembly shown in Fig. 6.

Figure 1:
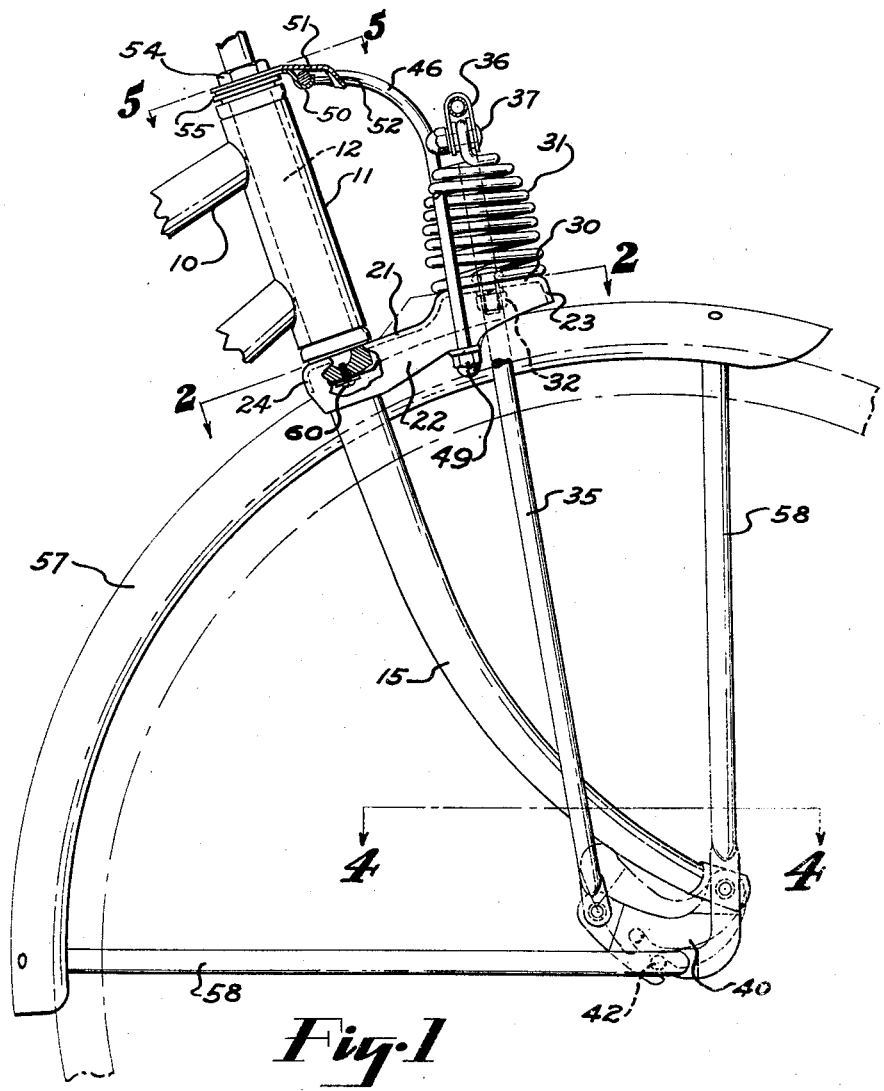
Fig. 1 is a fragmentary view in elevation of a bicycle showing the front wheel assembly.
Figure 2:
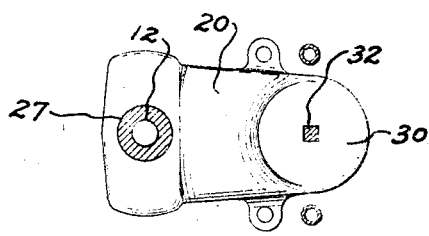
Fig. 2 is a view taken on line 2—2 of Fig. 1.

Referring now to Figs. 1 to 5 of the drawings, the front portion of a conventional frame 10 of a bicycle is shown, which frame includes the usual steering post 11 in which the stem 12 of a forked member 13 is journalled. The forked member 13 includes a yoke portion 14 with two tines 15 and 16 projecting downwardly from the yoke and parallel to one another, and preferably they curve forwardly as shown in Fig. 1. The front wheel of the bicycle is mounted, indicated at W, between the tines of the forked member and handle bars, not shown, are attached to the upper end of the stem 12 for steering the wheel through the forked member.

A sheet metal stamping 20 is attached to the yoke 14 and it extends forwardly above the wheel. The stamping 20 is in the form of a shell inasmuch as it is provided with a longitudinal wall 21 having curved longitudinally extending side walls 22 and end walls 23 and 24, the side and end walls being continuous. One end of the member 20 has an opening 27 therein, through which the stem 12 of the forked member 13 extends and the end portion of the stamping surrounding the opening 27 is formed to closely embrace the upper surface and side surfaces of the yoke 14, for providing a substantial contact surface between the stamping and the yoke so that the stamping can be welded to the yoke throughout sufficient area to securely attach the stamping to the yoke. Referring to Fig. 3, it will be seen that the sides 22 of the stamping 20 are contoured as at 28 to provide this substantial contact with the yoke. The stamping 20 extends forwardly above the wheel of the bicycle and a circular platformed surface is formed at 30 on which a tension spring 31 is mounted. The tension spring is bolted at its lower end to the surface 30 by a bolt and nut 32.

An inverted U-shaped strut member 35 is attached to the upper end of the spring 31 by a bracket 36 and bolt and nut 37. The two legs of the member 35 extend downwardly and straddle the wheel and extend on the outsides of the tines 15 and 16 of the forked member 13. The lower ends of the legs of the member 35 terminate slightly rearwardly of the ends of the tines 15 and 16, respectively, and the leg and tine on one side of the wheel are interconnected by a link member 40 and the leg and tine on the opposite side are interconnected by a similar link member 41. The links 40 and 41 are connected to the member 35 and the tines 15 and 16 by pivotal connections, so that the strut member 35 may move in a vertical direction relative to the tines 15 and 16. The links 40 and 41 are each provided with a slotted portion 42 for receiving the end portions of an axle 43 of the bicycle wheel. The axle 43 is secured to the links by nuts 44. As may be seen in Fig. 1, the front wheel may have vertical movement against the tension of spring 31, such movement being indicated by broken lines. Thus, road shocks will be partially absorbed by the spring suspension mechanism to greatly improve the riding quality of the bicycle.

The extending end of the stamping 20 is reinforced by a U-shaped brace rod 46, the ends of which have a threaded neck 47 of reduced diameter which extends through two laterally projecting ears 48 formed on opposite sides of the stamping and nuts 49 are threaded on the ends of the brace 46 for drawing the shoulders formed at the base of the necks 47 to the ears 48. The upper end of the member 46, which is the yoke portion, is curved rearwardly toward the stem 12 of the forked member 13, and this yoke portion is secured in a channel extending transversely of a stamping 50, which stamping has an opening therethrough, through which the stem 12 extends. A second stamping 51 is mounted on the stem 12 and overlies the stamping 50 to firmly retain the yoke of brace 46 in the channel of stamping 50. The stamping 51 is provided with a downwardly extending flange portion 52 which is slotted on opposite sides, as at 53, for receiving the brace rod 46. The stampings 50 and 51 are secured together by a collar nut 54 threaded on the stem 12, and which presses the stampings to a collar 55 on the stem.

The usual mud guard 57 is attached to the tines 15 and 16 of the forked member 13 by the brackets 58 in the usual manner and the upper portion of the guard is attached to the under side of the yoke 14 by a screw 60. It will be seen that the mud guard will lie immediately beneath the stamping 20. The stamping 20 will thus be complementary in appearance to the mud guard and its appearance and function as a support for the spring 31 will not detract from the appearance of the bicycle and at the same time it provides a sturdy and inexpensive mounting for the spring.

Another form of the invention is embodied in the wheel suspension shown in Figs. 6 and 7. In this form of the invention, a sheet metal stamping 120 is provided, which is similar to the stamping 20, except that it is slightly shorter and it has no ears corresponding to ears 48. The stamping 120 is formed to be attached to the bicycle yoke 14, in a manner similar to that described with reference to stamping 20. Likewise, reinforcing side walls 122 are provided, as well as a platform structure 130.

Two tension springs 131 and 132, are attached to the platform 130 by bolts and nuts 133. The upper ends of the springs are attached to the yoke member of an inverted U-shaped support, which support includes two substantially vertical parallel rods 135 and 136, which extend on opposite sides of the front wheel, and a yoke bar 137 which interconnects the upper ends of the rods 135 and 136. Shoulders are formed about the upper ends of these rods to support yoke bar 137 and cap nuts 138 are threaded onto rods to hold the yoke bar in place. The upper ends of the springs 131 and 132 are secured to the yoke bar 137 by bolts and nuts 139. The lower ends of rods 135 and 136 are connected to the floating ends of links 40, which support the front wheel, as described with reference to the structure shown in Figs. 1 to 5.

Preferably, a brace 141 is connected at the lower ends to the tines 15 and the upper end is secured to the steering post by a clamp 142.

Although I have described but two forms of the invention, it will be understood that other forms may be adopted, all falling within the scope of the claim which follows.

I claim:

A spring suspension structure for the front wheel of a bicycle, which bicycle includes a forked member having a stem extending from the yoke thereof and journalled in the front of the bicycle frame, and between the tines of which member the front wheel is mounted, said structure comprising: a shell-like sheet metal stamping having an opening in one end surface to receive the stem of the forked member therethrough and the stamping being downwardly flanged adjacent to said opening to embrace the upper and side surfaces of the yoke of the forked member for providing a substantial contact surface with the yoke, said stamping extending forwardly above the front wheel and terminating in a platformed surface having a downwardly extending continuous flange along the sides and across the end thereof; apertured ears formed on opposite sides of the stamping and extending outwardly in opposite directions from the lower edge of said flange; brace rods attached to the stem above the stamping and extending through the apertures in said ears and terminating immediately below said ears, nuts on said brace rods below the ears for supporting the free end of said stamping; a tension spring attached at its lower end to the platformed surface; an inverted U shaped strut straddling the front wheel of the bicycle and having its yoke attached to the upper end of said spring; a link member interconnecting the end of one tine of the forked member with the end of the U strut on one side of the wheel and a similar link member interconnecting the end of the other tine of said forked member with the other end of said strut, said links being substantially parallel and having said front wheel mounted thereto.

HERMAN L. KRAEFT,

REFERENCES CITED

The following references are of record in the file of this patent:

UNITED STATES PATENTS

| Number | Name | Date |
| --- | --- | --- |
| 1,101,614 | Bramham | June 30, 1914 |
| 1,189,874 | Schickel | July 4, 1916 |
| 1,213,995 | Anderson | Jan. 30, 1917 |
| 1,254,798 | Harley | Jan. 29, 1918 |
| 1,595,419 | Woller | Aug. 10, 1926 |